(12) United States Patent
Wang et al.

(10) Patent No.: US 8,189,287 B2
(45) Date of Patent: May 29, 2012

(54) EQUALIZATION AND MINIMIZATION OF MULTI-HEAD STACK ASSEMBLY'S MOTION DURING SELF SERVO WRITING AND HDD OPERATION

(75) Inventors: Bill Wang, San Jose, CA (US); Kelly Williams, Brentwood, CA (US); Seong Woo Kang, San Jose, CA (US); Bong Jin Lee, Fremont, CA (US)

(73) Assignee: Seagate Technology International

( * ) Notice: Subject to any disclaimer, the term of this patent is extended or adjusted under 35 U.S.C. 154(b) by 471 days.

(21) Appl. No.: 12/402,418

(22) Filed: Mar. 11, 2009

(65) Prior Publication Data

US 2010/0232068 A1 Sep. 16, 2010

(51) Int. Cl.
*G11B 33/14* (2006.01)
*G11B 5/48* (2006.01)
(52) U.S. Cl. .................................. 360/97.01; 360/97.02
(58) Field of Classification Search .................... 360/244
See application file for complete search history.

(56) References Cited

U.S. PATENT DOCUMENTS

| | | | | |
|---|---|---|---|---|
| 5,886,850 A * | 3/1999 | Kaczeus et al. | ............ | 360/97.01 |
| 5,995,327 A * | 11/1999 | Hanada et al. | ................ | 360/244 |
| 6,480,364 B1 * | 11/2002 | Thanomsat et al. | ....... | 360/265.7 |
| 2002/0105754 A1 * | 8/2002 | Goeke et al. | ............... | 360/98.01 |

* cited by examiner

*Primary Examiner* — Tan T. Nguyen

(57) ABSTRACT

A disk hard disk drive that includes a spindle motor and an actuator arm coupled to a base plate. A plurality of disks are coupled to the spindle motor and a plurality of heads are coupled to the actuator arm and the disks. The drive also includes a cover attached to the base plate. The cover and base plate enclose a hard disk area that has a horizontal center line. The hard disk area includes a volume of air above the horizontal center line that is equal to a volume of air below the horizontal center line. The air space within the hard disk area is equal and symmetrical in a vertical direction. Such an arrangement reduces track mis-registration when servo is copied from a disk surface to the other surfaces of the disks in the drive.

7 Claims, 2 Drawing Sheets

EQUALIZATION AND MINIMIZATION OF MULTI-HEAD STACK ASSEMBLY'S MOTION DURING SELF SERVO WRITING AND HDD OPERATION

BACKGROUND OF THE INVENTION

1. Field of the Invention

The subject matter disclosed generally relates hard disk drives.

2. Background Information

Hard disk drives contain a plurality of heads that are magnetically coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is stored in radial tracks that extend across the surface of each disk. Each track is typically divided into a number of segments or sectors. The voice coil motor and actuator arm can move the heads to different tracks of the disks.

Each sector may have a servo field located adjacent to a data field. The servo field contains a plurality of servo bits A, B, C and D that are read and utilized in a servo routine to position the head relative to the track. By way of example, the servo routine may utilize the algorithm of ((A−B)−(C−D)) to create a position error signal ("PES"). The PES is used to create a drive signal for the voice coil motor to position the head on the track.

The servo bits can be written onto the disk by initially writing reference servo bits onto one disk surface with a servo writer. After the drive is assembled the reference servo bits are used to write servo bits on the other disk surfaces. Copying servo from one disk to other disks within a sealed drive may result in track mis-registration.

BRIEF SUMMARY OF THE INVENTION

A disk hard disk drive that includes a spindle motor and an actuator arm coupled to a base plate. A plurality of disks are coupled to the spindle motor and a plurality of heads are coupled to the actuator arm and the disks. The drive also includes a cover attached to the base plate. The cover and base plate enclose a hard disk area that has a horizontal center line. The hard disk area includes a volume of air above the horizontal center line that is equal to a volume of air below the horizontal center line.

DETAILED DESCRIPTION

Disclosed is a disk hard disk drive that includes a spindle motor and an actuator arm coupled to a base plate. A plurality of disks are coupled to the spindle motor and a plurality of heads are coupled to the actuator arm and the disks. The drive also includes a cover attached to the base plate. The cover and base plate enclose a hard disk area that has a horizontal center line. The hard disk area includes a volume of air above the horizontal center line that is equal to a volume of air below the horizontal center line. The air space within the hard disk area is equal and symmetrical in a vertical direction. Such an arrangement reduces track mis-registration when servo is copied from a disk surface to the other surfaces of the disks in the drive.

Figure 1:
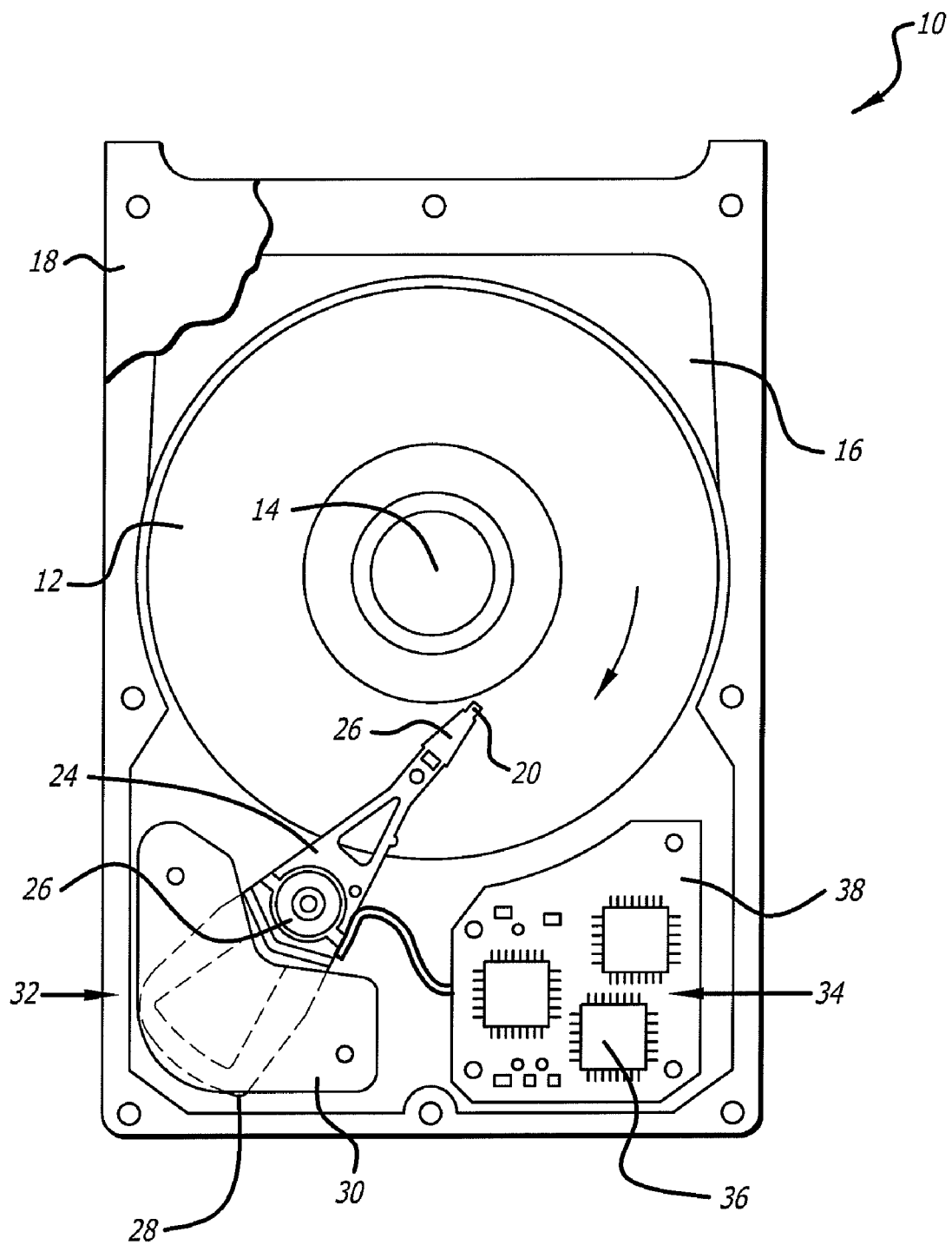
FIG. 1 is a top view of a hard disk drive.
Figure 2:
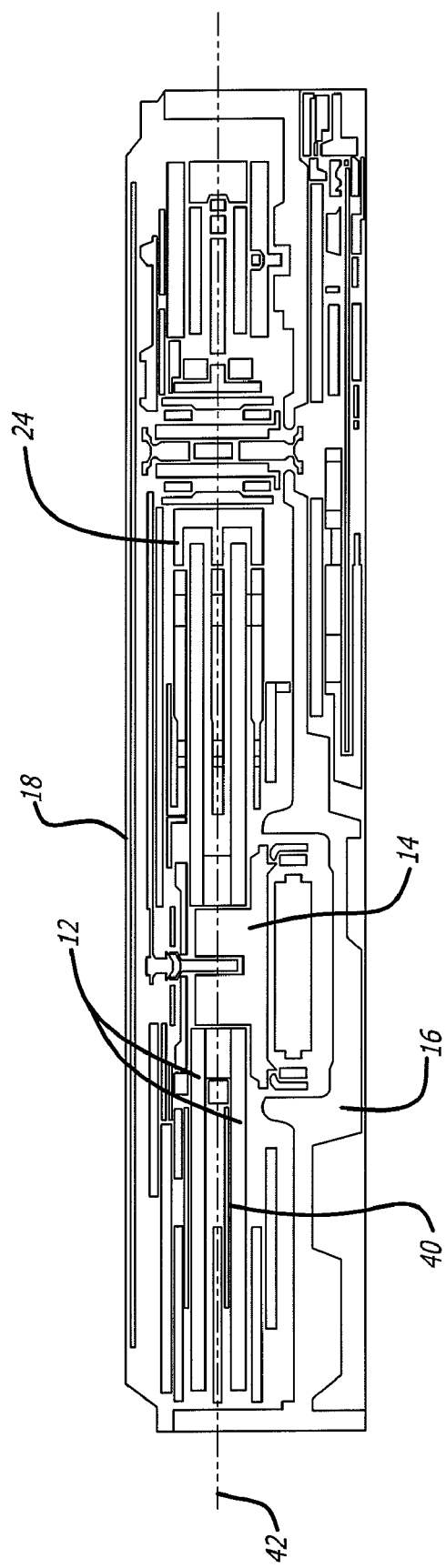
FIG. 2 is a side view of the hard disk drive.

Referring to the drawings more particularly by reference numbers, FIGS. 1 and 2 show an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown) that magnetize and sense the magnetic fields of the disks 12.

Each head 20 may be gimbal mounted to a flexure arm 22 as part of a head gimbal assembly (HGA). The flexure arms 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

Each head 20 has an air bearing surface (not shown) that cooperates with an air flow created by the rotating disks 12 to generate an air bearing. The air bearing separates the head 20 from the disk surface to minimize contact and wear.

The hard disk drive 10 may include a printed circuit board assembly 34 that includes a plurality of integrated circuits 36 coupled to a printed circuit board 38. The printed circuit board 38 is coupled to the voice coil 28, heads 20 and spindle motor 14 by wires (not shown).

The cover 18 and base plate 16 enclose a hard disk area ("HDA") 40. FIG. 2 shows a horizontal center line 42 that extends across the center of the HDA 40. The drive is designed and assembled so that there is an equal volume of air above and below the center line 42. This creates the same air flow and pressure throughout the HDA 40. To create the equal air volumes the drive components such as the disks 12 and heads 20 can be divided equally above and below the horizontal center line 42.

Each disk surface may have a plurality of servo bits. The servo bits can be created by first writing a pattern of reference servo bits on one of the disk surfaces. The reference servo bits can be written with a servo writer (not shown) as is known in the art. The reference servo bits are typically written before the cover 18 is attached to the base plate 16. After the cover 18 is attached to the base plate 16 the reference servo bits can be copied onto the other disk surfaces. This can be performed with the integrated circuits 36 of the drive. The equal air volume about the center line 42 reduces track mis-registration that may occur if the air volumes were uneven.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
a base plate;
a spindle motor coupled to said base plate;
a plurality of disks coupled to said spindle motor;
an actuator arm mounted to said base plate;
a voice coil motor coupled to said actuator arm;

a plurality of heads coupled to said actuator arm and said disks; and, a cover attached to said base plate, said cover and said base plate enclose a hard disk area having a horizontal center line, said hard disk area includes a volume of air above said horizontal center line that is equal to a volume of air below said horizontal center line.

2. The hard disk drive of claim 1, wherein there are an equal number of disks above and below said horizontal center line.

3. The hard disk drive of claim 2, wherein there are an equal number of heads above and below said horizontal center line.

4. The hard disk drive of claim 1, further comprising a circuit that causes a writing of servo on at least one disk surface.

5. A method for copying servo onto at least one disk of a hard disk drive, comprising:

providing a hard disk drive including;
a base plate;
a spindle motor coupled to said base plate;
a plurality of disks coupled to said spindle motor, at least one of said disks having servo information;
an actuator arm mounted to said base plate;
a voice coil motor coupled to said actuator arm;
a plurality of heads coupled to said actuator arm and said disks;
a cover attached to said base plate, said cover and said base plate enclose a hard disk area having a horizontal center line, said hard disk area includes a volume of air above said horizontal center line that is equal to a volume of air below said horizontal center line; and,
copying the servo information onto at least one other disk of the hard disk drive.

6. The method of claim 5, wherein there are an equal number of disks above and below the horizontal center line.

7. The method of claim 6, wherein there are an equal number of heads above and below the horizontal center line.

* * * * *